(12) United States Patent
Silliphant

(10) Patent No.: US 6,561,646 B2
(45) Date of Patent: May 13, 2003

(54) VIEWING OF AN ANAGLYPH WITH IMPROVED STEREOSCOPIC IMAGE PERCEPTION

(76) Inventor: Allan Silliphant, 1220 W. Glenoaks Blvd. Suite 104, Glendale, CA (US) 91201

( * ) Notice: Subject to any disclaimer, the term of this patent is extended or adjusted under 35 U.S.C. 154(b) by 0 days.

(21) Appl. No.: 09/901,336

(22) Filed: Jul. 9, 2001

(65) Prior Publication Data

US 2001/0048505 A1 Dec. 6, 2001

(51) Int. Cl.[7] ................................................. G02C 7/10
(52) U.S. Cl. ............................ 351/44; 348/60; 359/464
(58) Field of Search ............................ 351/44, 163, 41; 345/7, 9; 348/51, 54, 60; 349/15; 359/462, 464

(56) References Cited

U.S. PATENT DOCUMENTS 4,134,644 A * 1/1979 Marks et al. ............... 359/464
4,836,647 A * 6/1989 Beard ......................... 359/462
5,243,460 A * 9/1993 Kornberg ..................... 351/162
5,880,883 A * 3/1999 Sudo ........................... 359/462

* cited by examiner

Primary Examiner—Huy Mai
(74) Attorney, Agent, or Firm—Robert J. Schaap

(57) ABSTRACT

An optical instrument which allows for perspective viewing of an anaglyphic image with minimal optical distortion. In one embodiment, the instrument relies upon anaglyphic lenses with one lens being formed of a first primary color and a second lens comprised of at least one other primary color. In one aspect, either one or both of the lenses has a diopter strength greater than a conventional filter. In another aspect, one of the lenses has a diopter optical strength greater than that of the other and which thereby reduces distortions which may otherwise arise. Thus, one lens will have a lower diopter than the other. In another embodiment of the invention, a lens density difference between two lenses are used. One lens has a greater density then the other lens within a specified amount. The color variance between two lenses is also specified.

32 Claims, 1 Drawing Sheet

VIEWING OF AN ANAGLYPH WITH IMPROVED STEREOSCOPIC IMAGE PERCEPTION

BACKGROUND OF THE INVENTION

1. Field of the Invention

This invention relates in general to certain new and useful improvements in viewing of improved perceptions of stereoscopic images and, more particularly, to improved anaglyphic viewing which eliminates optical distortions which otherwise arise with conventional anaglyphic filters.

2. Brief Description of Related Art

An anaglyph is a composite picture which has been photographed from two slightly different angles. Each angle is then filtered to remove one of the three primary colors (red) from one view, and the opposite two of the three primary colors (both green and blue) from is the other view. The two are superimposed and viewed with a red filter over one eye and a complementary colored filter, either blue or green over the other eye. This filtration causes a vectoring of discreet image information to go to each eye and pass into the visual center of the brain for processing into a virtual stereoscopic image.

The purpose of the color filtering is wholly related to separation of the two points of view. In other stereo photo methods, the images are physically separated by a mechanical viewing device (a stereoscope) or may be polarized, thereby reducing color distortion when displayed through projection onto a screen through a set of two of angled Polaroid filters on the projector. Polarized glasses and anaglyph glasses are the two most common examples of use of glasses to see stereo. Shutter liquid crystal glasses are a third alternative presently used with television and computer screens.

In most cases, conventional anaglyphic spectacles would use one filter which is formed of a primary red color and a second filter is essentially a primary blue filter. In essentially all cases, it was assumed that there necessarily was no need for an optical strength, let alone an equality of optical strength in each of the filters used in a pair of spectacles. In practice, filters had no power as they were almost always gel filled.

Filters of the type used in the prior art have no power and do not affect the focal length of an image with respect to the viewer and, thus, filters are more in the nature of a transparent medium. Therefore, for the purposes of the present invention, the viewing medium of the invention typically comprises lenses, which do affect the optical viewing characteristics of a viewer.

Prior art in anaglyph spectacles is almost a "folk technology", in that very little attempt has been made to optimize the resulting effect. As stated above, the primary color red is almost always the "reddish" color of the viewing filter. Its opposite color would be both blue and green in equal amounts to effect the maximum cancellation of light. In the folk practice of anaglyph, blue filters have been almost universally used, mainly due to lower cost of material and a general lack of optical knowledge on the part of the makers.

In all known prior anaglyph art, simple filters have been used in front of the viewers' eyes. In other cases, paper framed glasses have been put over the prescription eye wear of the viewer. An unintended consequence of using simple filters over the unaided eye is a subtle negative focus shift, in effect, an introduction of the symptoms of "farsightedness". In a theater context, they would have little effect due to the long distance between a viewer and a screen. In the case of a computer screen, less than a meter normal spacing, the viewer typically experiences eyestrain when using gel filter glasses. In fact, the red filtered image is very noticeably out of focus in most cases due to the focus accommodation limits of all but the most youthful viewers. Plastic mounted filters have the same poor performance as paper framed glasses mentioned above.

The symptom arising out of use of the conventional anaglyph viewing filters were numerous and well known. In many cases, after a short period of time, the use of anaglyph lenses would cause fatigue and, in some cases, even dizziness. Frequently, users of these filters when viewing an anaglyph would complain of optical distortion with use of the filters. In essentially all cases, viewers complained of discomfort arising out of the use of anaglyph filters. It is because of these complaints use of this type of sterographic technology has fallen into a state of relative disuse.

Anaglyphic stereoscopic viewing is a technology which has been in existence for well over one hundred years. For some of that time, particularly in the 1950's and early 1960's, in the United States, anaglyphic viewing for purposes of amusement, such as in books and movie theaters, had become quite popular. In each of these anaglyph stereoscopic viewing medium, the conventional red and blue filters were mounted in a frame for wearing as a pair of glasses. The viewer would then view the anaglyph to obtain a three dimensional image. However, the technology of anaglyph viewing has not really been advanced beyond the stage of amusement and novelty type viewing. Even there, because of the distortions and the inconvenience of wearing anaglyphic filters, this form of stereoscopic viewing has become relatively dormant.

Heretofore, and due to the distortions as well as poor optical quality and, particularly, color rendition with anaglyphic stereoscopic reading, the concept of anaglyphic gel spectacles with anaglyphic images or prints was only used as a novelty item. However, it has been recognized that if the limitations of simple filters could be overcome, this technology could be elevated from a novelty item to a very useful art with numerous scientific applications.

The problem which involves the use of anaglyphic spectacles is addressed with an optical remedy as proposed in this present application. In effect, all prior anaglyph art has ignored this phenomenon and has consistently relied on simple filters, which are innately flawed by their inability to provide a sharp picture without optical diopter correction for the natural focus shift between the two very different colors, and the lesser distortion caused by the simple interruption of the light rays by a filter of either or both colors. These discrete problems are separately addressed in the present application.

OBJECTS OF THE INVENTION

It is, therefore, a primary object of the present invention to provide an anaglyphic optical instrument which employs a pair of actual lenses with one lens located for each eye of a viewer and where one or both of the lenses have diopter strength to alter viewing compatibility.

It is another object of the present invention to provide an anaglyphic optical instrument of the type stated which employs a pair of actual lenses with one lens located for each eye of a viewer and where one of the lenses has a different diopter strength than that of the other.

It is a further object of the present invention to provide an optical instrument of the type stated in which there are a pair of lenses in a pair of spectacles for perspective viewing of an anaglyphic image and wherein one of the lenses has a density different from that of the other of the lenses by a factor in a specified range of density differentials.

It is an additional object of the present invention to provide a pair of spectacles having a pair of lenses and where one of the lenses is a red lens and the other is a cyan lens designed to reduce red overload in viewing and where the colors forming the cyan exist in a specified percentage.

It is also an object of the present invention to provide an optical instrument of the type stated which allows for perspective viewing of an anaglyphic image with minimal focal distortion, thereby reducing eye strain.

It is another salient object of the present invention to provide a method of allowing for perspective viewing of an anaglyphic image without optical distortion by use of a pair of lenses which are corrected to provide optical efficiency.

With the above and other objects in view, my invention resides in the novel features of form, construction, arrangement and combination of parts and components presently described and pointed out in the claims.

BRIEF SUMMARY OF THE INVENTION

The present invention provides an optical instrument for perspective viewing of an anaglyphic image with minimal focal distortion, thereby reducing eye strain. The focal distortion is manifest on two distinct levels, each presenting a different problem, and each demanding a different remedy.

It has been found that the introduction of the set of colored filters into the space between the eyes and the screen of a computer causes a slight degree of perceived "farsightedness". This i sufficient to cause discomfort or softness of vision at once. It is aggravated by a phenomenon referred to in the field as "retinal rivalry". This describes the disorienting effect of seeing the same object in radically different degrees of darkness and color. The softness of the focus and the brain's visual cortex response to the shock of retinal rivalry combine to effect stress, confusion and eye strain.

In a broad aspect, therefore, the invention lies in the discovery that diopter power in a pair of lenses in a pair of anaglyphic spectacles for perspective viewing of an anaglyphic image is highly desirable to account for distortion resulting from different colored lenses. Even more specifically, the present invention resides in the discovery that there is a requirement for correction of two lenses by addition of a diopter power so that the actual anaglyphic image is received with significantly less distortion then when there are only two conventional filters.

The remedy proposed by the present invention is to introduce a pair of matched, very low power reading lenses, much like those found in the least powerful commercially available reading glasses. The colors would be added directly into the optical acrylic lenses or other lenses at the time of their molding in the actual plastic material. In effect, lowest power reading glasses of one-half to one power would be turned into anaglyphic eye wear by the simple insertion of the appropriate filter colors. A device of this type would greatly improve the results obtainable with the prior art gel filters alone, or those with colored plastic filters. Therefore, in another broad aspect, the invention lies in the discovery that optical symmetry between a pair of lenses in a pair of anaglyphic spectacles for perspective viewing of an anaglyphic image is not required. Even more specifically in this second aspect of the present invention, there is a discovery that not only is there not a requirement for optical symmetry of the two lenses but, in fact, the actual anaglyphic image is received with significantly less distortion when there is a built-in lack of symmetry between the two lenses.

The second remedy addresses the disparity in focus innate between light passing through a red filter and light passing through a blue or green filter. Traditional anaglyph filter pairs always have marked softness of focus manifest in the red filtered eye of the viewer when viewing near objects, such as a computer screen or hand-held magazine. The degree of focus shift is such that a corrective differential of one-third power to as much as two-thirds power is required to match the perception of the two eyes. In practice, this is achieved in the present invention by building glasses with that differential built into the paired lenses along with the appropriate color of filters to achieve image separation for stereo. The retinal rivalry is addressed in the choice of filter density in the red filer in particular.

It is widely recognized by researchers that red light or coloration in nature tend to be the color for maximum attention. Red light in the vision of a person tends to be responded to in predictable ways. Warning lights, red policy lights, red on snakes, spiders, poison leaves, or the effect of actual blood on the lens of the eye are all indications that too much red intensity in light is a potential irritant. By reducing the amount of red light allowed to pass through the filter to the eye, some of the effect of retinal rivalry is remedied. A simple darkening of the red filter to some degree improves comfort, while leaving the cyan lighter.

By creating a density differential, as well as the previously mentioned optical power differential, the vision of the user becomes more comfortable and the details of the scene more visible. The filtered lenses have now become asymmetrical in two important ways in order to achieve symmetry in perception. It is important to note the prior art assumed that the densities of the filters and the power value of the respective filters (no true lenses used) would best be symmetrical. The use of the first level of correction (matched lenses with color added) is itself an innovation, which greatly overcomes the inherent problems in the prior art. The addition of the side-to-side differential optical power further increases the degree of remedy to a much higher level.

Therefore, and based on the above, it has been found in connection with the present invention that where there is a different diopter strength between one and the other lenses, the anaglyphic image reading is improved. In addition, it has also been found in accordance with the present invention that where there is a difference in density between the two lenses, perspective image viewing is also greatly improved. Finally, it has been found that by using a specified range of colors to produce a cyan lens in combination with a red lens, that the phenomena of red overload is reduced, if not completely eliminated.

As indicated previously, a focus shift can be effectuated where lenses are employed and where a power exists in these lenses. As a result, and as aforesaid, a party using anaglyphic lenses temporarily observes an effect of farsightedness, such that mere objects are out of focus. The present invention thereby provides a diopter power to one of the lenses. Moreover, enhancement is provided with more power to the red lens, as opposed to a cyan lens. The chromatic differential between the pair of lenses causes a lack of symmetry in the unaided eyes. Thus, in this aspect of the invention, there is a correction by use of a positive diopter strength in the lenses but of unequal value. In this way, it is possible to bring the eyes back to a condition approximating the unaided eye, as close as possible.

In accordance with the invention, there are actually two corrections taking place. The first correction is that of shifting the focal length of each of the lenses to partially overcome the effects of farsightedness. Secondly, there is a shift in order to correct for light transmission through the filters of the invention.

It has also be found in the present invention that there is a linkage between the degree of image separation and filter density. It has also been found in accordance with the present invention that it is possible to control the amount of light transmissivity, particularly through the cyan lens. In fact, transmissivity of the light through the cyan lens can be as low as 9% of the normal light transmissivity through a lens for optimum stereo visualization. However, transmissivity can be increased to 50% through the cyan lens compared to light transmissivity through a normal lens, although with a sacrifice in the amount of stereo effect an optically unaltered filter achieves. In other words, one can compromise the stereo effect to achieve excellent light transmissivity. In effect, and by regulating the amount of light passing through the cyan lens, there is a linkage between image separation and a red constant.

It has further been found that there is a linkage between the image separation and the density of the lenses and, particularly, the cyan lens. By using image separation of only one to two pixels, maximum transmissivity of light is achieved. However, with an image separation which is greater as, for example, five to six pixels or more, a greater stereo effect is achieved, although light transmissivity is reduced. Image separation should range between two and six pixels. Thus, where true color is critical, the brightness can be increased. In like manner, where relief is a critical feature in an image, the pixel difference between the pair of images is also increased.

There is also a synergism found between the fact that a difference in diopter strength between a pair of lenses and, in addition, a differential between the optical density of the two lenses also greatly enhances the viewing of an anaglyphic image without distortion and the optical aberrations which were otherwise introduced with symmetrical lenses. The synergism between these two effects is not fully understood but, nevertheless, has been observed.

More specifically, the present invention resides in an optical instrument which allows for perspective viewing of an anaglyphic image with minimal optical distortion. In particular, the instrument comprises a first lens of a first primary color and a second lens of a second primary color. The second lens has a diopter optical strength which is different from that of the first lens and where the difference is established to reduce distortion which might otherwise exist. The differences in diopter strength between the two lenses is specified in more detail hereinafter in preferred ranges therefor.

The present invention also relates to an optical instrument of the type stated in which the second lens has a color density different from that of the first filter by a factor of at least 0.4 and which thereby also reduces distortion which might otherwise arise and improves optical clarity. The second lens preferably has a density which is different from that of the first lens by a factor of between 0.4 to about 2.0.

The present invention provides a further improvement in anaglyphic spectacles for viewing by a user and which also includes a pair of lenses with one of the lenses being colored a red lens and the other of the lenses being a cyan colored lens. This particular pair of spectacles includes an improvement where the cyan lens is comprised of blue and green colors and where the amount of the blue ranges between 35% to 65% of the amount of the green generating the cyan color. Even more preferably, these two colors normally exist in equal amount. It has been found that by using a cyan lens of these color combinations, that actual light transmission through the cyan lens can be significantly higher than the conventional blue filter of the prior art without optical degradation.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
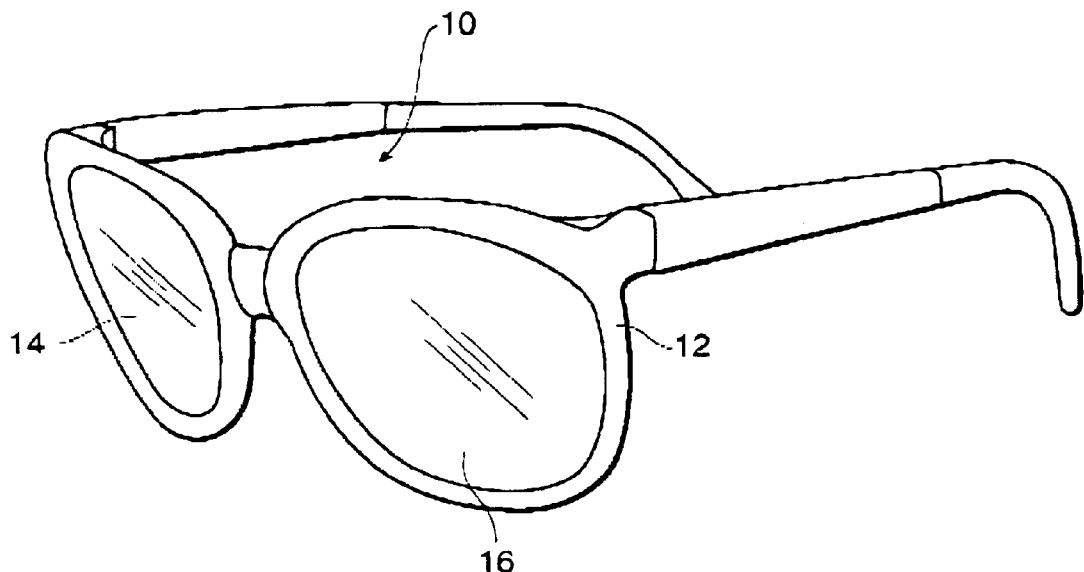
Figure 2:
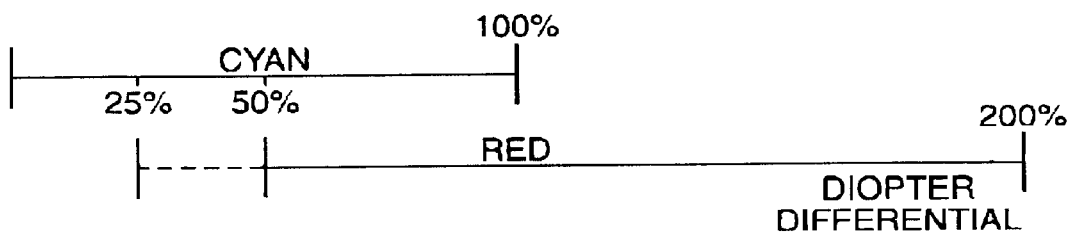
Figure 3:
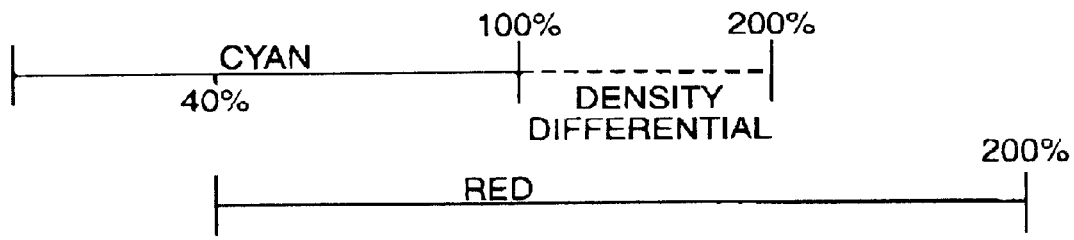

Having thus described the invention in general terms, reference will now be made to the accompanying drawings in which:

FIG. 1 is a perspective view of a pair of anaglyphic spectacles in accordance with the present invention;

FIG. 2 is a schematic graphical illustration showing a difference in diopter strength between a pair of lenses in the spectacles of the invention; and FIG. 3 is a schematic graphical illustration, similar to FIG. 2, and showing the difference in optical density between a pair of lenses in accordance with the present invention.

DETAILED DESCRIPTION OF PREFERRED EMBODIMENTS

Referring now in more detail and by reference characters to the drawings, FIG. 1 illustrates a pair of anaglyphic spectacles 10 in accordance with the present invention and comprising a conventional frame 12 with a left lens 14 and a right lens 16. One of the lenses, such as the lens 14, is a red colored filter lens and the other of the lenses, such as the lens 16, is a cyan colored lens. The exact orientation of the two lenses on either the left or right side is not critical.

It has been found in accordance with the present invention that with use of the lenses, as hereinafter described, perspective viewing with excellent reproduction in posters, prints, lithographs, and even electronically transmitted images, such as those over the world wide web, can be obtained.

The left lens, such as the lens 14, is formed of a red color, as aforesaid, and essentially is a primary red. The right lens, or the cyan colored lens, is a combination of blue and green.

In essentially all anaglyphic prints, two photographs of the same scene are obtained and angularly displaced apart from one another by a small distance and filtered for removal of a primary color. Consequently, when the two images exist on the same print, they are typically out of focus when viewing without any lenses. In accordance with the invention, a relatively good print is obtained for excellent viewing even without the anaglyphic lenses, although the perspective effect is not truly obtained without the lenses. Nevertheless, with the lenses, and even without the lenses, the quality of the print is excellent and, moreover, there is no focusing limitation to overcome.

In accordance with a first aspect of the invention, there is a diopter power factor in one and preferably both of the lenses. The diopter power of each lens may be the same or it may be different compared to the other lens, as hereinafter described. In this way, by using simple reading glasses with red and cyan lenses, distortion is substantially reduced if not fully eliminated. The diopter strength of the lenses can be relatively small, e.g., 10% greater than correctional filters, although greater strength, such as 25% to 200%, is preferred.

In accordance with the second aspect of the invention, there is preferably a diopter power differential between the two lenses, such that one lens has a diopter or a fraction of a diopter difference than the other of the lens. In this way, red overload or so-called "red rivalry" can be substantially reduced if not fully eliminated, as described above. In essence, by properly attenuating the colors, the white in a picture is a true white and the red is a true red.

The diopter difference can range between 25%, as shown in FIG. 2, to 200% of that of the other of the lenses. Thus, in this case, the diopter power of the cyan colored lens would be one-half of that of the red lens. In like manner, the red lens could have a diopter power of 1.5 times greater than that of the cyan lens. Normally, the red lens or left lens 14 will have the higher diopter power. Nevertheless, the diopter power of each of the lenses can vary, although they are preferably different in accordance with this second aspect of the invention. Thus, the diopter power of the red lens could be 3.5 and the diopter power of the cyan lens could be 3.0. In like manner, the diopter power of the red lens could be 2.5 and the diopter power of the cyan colored lens could be 2.25. In a preferred embodiment of the invention, the diopter power of the red lens should be at least 50% greater than that of the cyan lens. Thus, the red lens could have, for example, a diopter power of 1.0 and the blue lens could have a diopter power of 0.5. It is preferable, as aforesaid, to have a diopter difference of at least 0.5 in favor of the red lens.

The difference in diopter power can vary depending on the shade of red which is desired. Controlling the amount of cyan color and the amount of red color will provide for a chromatic shift either off of the primary red or the cyan color. The diopter correction itself can be varied to reflect better skin tones of individuals, for example.

The actual prints or images which are used are comprised of a pair of images which are offset from one another, as aforesaid. However, the displacement between the two images is very small, such as, for example, by one to two pixels. In this case, the displacement should be no less than one pixel and no more than five pixels. In this way, the picture or image appears to be normal even without any anaglyphic lenses, but when used with the anaglyphic lenses will have a three dimensional appearance. In effect, the anaglyphic image is therefore referred to as an "embedded three dimensional image".

It has also bee found in accordance with a third aspect of the invention that by using a different density of each of the lenses, further optical improvement is obtained. The prior art lenses and filters typically will pass between 10–12% of the available light. In contrast, the lenses of the invention have lesser density then the prior art lenses and filters and will pass at least 20% of the light. In this way, the greater color rendition is also obtained. It has also be found that by using a lens of 15% less density, it is possible to obtain a brightness increase of up to 300%.

When examining an image in the prior art, which was a red image, in many cases it would appear almost black with a blue filter and appear pink in a red filter. Again, by using a different lens density in each of the lenses, this problem has been reduced substantially. Moreover, the red does not shock perception. Consequently, the three dimensional pictures or images also appear to be quite good without these glasses themselves. Moreover, parallax is reduced and alignment is optimized.

FIG. 3 illustrates the density range of a blue lens and a red lens forming part of the spectacles. In this case, it can be observed that the red lens will normally have about 40% to about 200% greater density than the cyan lens. Thus, it can be seen that the underlying assumption of conventional prior art anaglyphic lens in which there is a complete symmetry in the lenses is rejected in the present invention. The invention is highly effective, in that as a result of the reduction in optical aberrations and the improvement in clarity, it is possible to use three dimensional viewing with anaglyphic images for purposes other than mere novelty pursuits. Rather, these lenses can now be used for advanced technological purposes which was not heretofore available.

Although the reason is not fully understood, it has also been determined that there is actually a synergistic effect in achieving better optical clarity by a dual lack of uniformity between the lenses 14 and 16, in that the red lens should preferably have a different diopter strength than the cyan lens and, in addition, that the red lens should have a density which is different than the that of the cyan lens. Both of these factors work in combination to greater enhance the optical clarity then that which was obtained individually.

As indicated previously, when colored lenses are placed in the line of vision of an individual and, particularly, the red lens, there is a mild farsightedness which is created. This chromatic differential causes a lack of symmetry in the unaided eyes. There is some correction by use of the positive diopter increase in the red filter. Nevertheless, the unequal value of the two lenses does create an additional problem with vision.

As also indicated above, as a fourth aspect of the invention, there is a linkage between the degree of image separation and the displacement of two images which create the stereo effect. By closely regulating the amount of separation of the two images, it is possible to control the amount of light transmissivity through the lenses. For maximum transmissivity, the amount of stereo separation is reduced. This may be desirable depending upon the particular purpose for which spectacles containing the lenses of the invention would be used. As a simple example, in scientific applications, where great visibility of relief is needed, maximum separation would be desirable. In fact, the separation may be necessary even at the cost of reduced light passage. However, in other applications where this degree of separation is not so critical, light transmissivity can be increased. Thus, it is possible to achieve viewing of an anaglyphic image with essentially the same clarity as a non-anaglyphic image, but also having stereoscopic effect with the use of the lenses.

It has also been determined that at 50% light transmissivity, the image is three times brighter than with a 9% light transmissivity. By adjusting the cyan lens, it is possible to obtain anywhere between 10% to 50% light transmissivity of that which would normally be obtained. More preferably, the normal range would be in about 15% to 18%.

Thus, there has been illustrated and described a unique and novel anaglyphic viewing medium and which thereby fulfills all of the objects and advantages which have been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. An optical instrument which allows for perspective viewing of an anaglyphic image with minimal optical distortion, said optical instrument comprising:
   a) a first lens comprised of a first primary color;
   b) a second lens comprised of at least one other primary color different than the first primary color;
   c) at least one of said lenses having a diopter optical strength different than that of a conventional filter having no diopter strength and which difference in diopter strength is sufficient to reduce optical distortion and retinal rivalry which may otherwise arise.

2. The optical instrument of claim 1 further characterized in that said first lens has a red color and said second lens has a cyan color.

3. The optical instrument of claim 1 further characterized in that both of said lenses have an optical strength different from that of a convention filter having no diopter strength by at least 0.3 diopter.

4. The optical instrument of claim 1 further characterized in that said first and second lenses have an optical strength different from that of a conventional filter having no diopter strenght by at least 0.5 diopter.

5. An optical instrument which allows for perspective viewing of an anaglyphic image with minimal optical distortion, said optical instrument comprising:
   a) a first lens comprised of a first primary color;
   b) a second lens comprised of at least one other primary color different than the first primary color;
   c) the diopter optical strength of each of said lenses being non-symmetrical with said second lens having a diopter optical strength different than that of the first lens and which difference in diopter strengths is sufficient to reduce optical distortion and retinal rivalry which may otherwise arise.

6. The optical instrument of claim 5 further characterized in that said first lens has a red color and said second lens has a cyan color.

7. The optical instrument of claim 5 further characterized in that said second lens has an optical strength different from that of said first lens by at least 0.3 diopter.

8. The optical instrument of claim 5 further characterized in that said second lens has an optical strength different from that of said first lens by at least 0.5 diopter.

9. The optical instrument of claim 5 further characterized in that said first lens has a diopter strength greater than that of the second lens by a factor which ranges from 0.25 diopter to 2.0 diopter greater.

10. The optical instrument of claim 9 further characterized in that said first lens has a density different from that of said second lens by a factor which ranges from 0.40 to about 2.0 of the density of the second lens.

11. The optical instrument of claim 5 further characterized in that said first lens has a diopter strength in the red color which is at least 0.5 diopter greater than that of the second lens.

12. An optical instrument which allows for perspective viewing of an anaglyphic image with minimal optical distortion, said optical instrument comprising:
   a) a first lens comprised of a first primary color;
   b) a second lens comprised of at least one other primary color different than the first primary color and which is reflected to achieve partial cancellation of the color of the first lens and without necessarily using intensity differential;
   c) said second lens having a color density which is different from that of said first lens by a factor of at least 0.4 and which color density correction thereby reduces the disparity in focus resulting from light passing through lenses comprised of different primary colors and improves optical clarity.

13. The optical instrument of claim 12 further characterized in that said second lens has a density which is different from that of said first lens by a factor which ranges from about 0.4 to about 2.0.

14. The optical instrument of claim 12 further characterized in that said second lens has an optical strength different from that of said first lens by at least 0.3 diopter.

15. The optical instrument of claim 12 further characterized in that said second lens has an optical strength different from that of said first lens by at least 0.3 diopter and said second lens has a density which is different form that of said first lens by a factor which range from about 0.4 to about 2.0.

16. Anaglyphic spectacles for wearing by a user and having a pair of lenses with one of the lenses being a red color lens and the other being a cyan colored lens, an improvement comprising forming the cyan lens with a color to reduce red overload in viewing, said cyan lens being comprised of blue and green colors and where the amount of blue range between 35% to 65% of the amount of green generating the cyan color.

17. The anaglyphic spectacles of claim 16 further characterized in that the amount of the ranges between 45% to 55% of the amount of green generating the cyan color.

18. The anaglyphic spectacles of claim 16 further characterized in that there are equal amounts of blue and green generating the cyan color.

19. The anaglyphic spectales of claim 16 further characterized in that the amount of light transmission through said cyan lens is as high as 18%.

20. A method for making an optical instrument allowing for perspective viewing of an anaglyphic image with minimal optical distortion, said method comprising:
   a) providing a device having a first lens of a first primary color and a second lens comprised of at least one primary color different than the first primary color; and
   b) establishing at least one of said lenses with a diopter optical strength different from that of a conventional filter having no diopter strength and which difference in diopter optical strength reduces optical distortion and retinal rivalry which may otherwise arise.

21. The method of claim 20 further characterized in that said method comprises establishing said first and second lenses with a diopter optical strength in the red color and which is at least 0.5 diopter greater than that of a conventional filter having no diopter strength.

22. The method of claim 20 further characterized in that said method comprises establishing both lenses of a diopter strength which is greater than that of a conventional filter having no diopter strenght.

23. A method for making an optical instrument allowing for perspective viewing of anaglyphic image with minimal optical distortion, said method comprising:
   a) providing a device having a first lens of a first primary color and a second lens comprised of at least one primary color different than the first primary color; and b) establishing said second lens with a diopter optical strength different from that of the first lens and which difference in diopter optical strength reduces optical distortion and retinal rivalry which may otherwise arise.

24. The method of claim 23 further characterized in that said method comprises establishing said first lens with a diopter optical strenght in the red color and which is at least 0.5 diopter greater than that of the second lens.

25. The method of claim 23 further characterized in that said first lens has a diopter strength which is greater than that of the second lens by a factor which ranges from 0.25 to 2.0.

26. The method of claim 23 further characterized in that the first lens has a density different from that of the second lens by a factor which range from 0.40 of the density of the second lens to about 2.0 of the density of the second lens.

27. A method for making an optical instrument which allows for perspective viewing of an anaglyphic image with desired light transmissivity and with minimal optical distortion, said method of making the optical instrument comprising:

a) providing a first lens comprised of a first primary color in a spectacle frame for viewing of a first image;

b) providing a second lens comprised of at least one other primary color different than the first primary color in the spectacle frame for viewing a second image transposed on the first image; and c) establishing a degree of image separation between the two images between one to five pixels to thereby increase light transmissivity through the lenses and improves viewing comfort without compromising optical clarity.

28. The optical instrument of claim 27 further characterized in that said second lens has a diopter strength different from that of said first lens.

29. The optical instrument of claim 27 further characterized in that said second lens has optical strength different from that of said first lens by at least 0.3 diopter.

30. An optical instrument which allows for perspective viewing of an anaglyphic image with minimal optical distortion, said optical instrument comprising:

a) a first lens comprised of a first primary color of red;

b) a second lens comprised of a second primary color of cyan and having a color density different than that of the first primary color;

c) the cyan lens being comprised of blue and green colors with the amount of blue ranging from between 35% to 65% of the amount of green generating the cyan color by a factor of 0.4 to reduce any disparity in focus; and d) at least one of said lenses having a diopter optical strength different than that of a conventional filter having no diopter strength and which difference in diopter strength is sufficient to reduce optical distortion and retinal rivalry which may otherwise arise.

31. The optical instrument of claim 30 further characterized in that both of said lenses an optical strength different from that of a conventional filter by at least 0.3 diopter.

32. The optical instrument of claim 31 further characterized in that said first lens has a diopter strength greater than that of the second lens by a factor which ranges from 0.25 diopter to 2.0 diopter greater.

* * * * *